Nov. 5, 1929.  J. A. HARTCUP  1,734,430

INDICATING ELEMENTS OF MEASURING INSTRUMENTS

Filed Oct. 31, 1927  2 Sheets-Sheet 1

Patented Nov. 5, 1929

1,734,430

UNITED STATES PATENT OFFICE

JOHN ARCHIBALD HARTCUP, OF NEWHOUSE, ENGLAND

INDICATING ELEMENTS OF MEASURING INSTRUMENTS

Application filed October 31, 1927, Serial No. 230,132, and in Great Britain November 8, 1926.

This invention relates to means for indicating the level or quantity of a liquid in a tank or other container, and is of the kind in which the indications are given by means of a dial and pointer.

The object of the invention is to so arrange or construct the dial or indicating means that the numerals or other designations are carried upon the dial plate in such a manner as to be movable upon the plate whereby the numerals or other designations can be changed or interchanged at will, the arrangement being such as to provide what may be briefly described as a universal dial or scale.

A further object is by a driven rotary member to impart rotary movement to the dial or plate which may have movable letters, figures or the like, or the letters, figures or the like may be fixed on the dial, or impressed, engraved or otherwise placed upon the dial plate so as to be clearly discernible.

According to my invention, I employ a universal dial device of the nature above described and the transmission movement is applied on a drum rotatable by a flange, or gear member or surface surrounding, or in proximity to, a dial scale, preferably with movable figures or other designations upon the face of the dial plate, or engraved or otherwise placed thereon.

The drum, rotated by the flange, has secured to it a cable, chain, wire or other flexible connector which is adapted to run in a groove on the drum and one end of it is secured to the drum and the other end passes out at an exit provided in an outer casing in which the drum revolves.

The drum revolves in the outer casing upon an axle rotated by the movement of the flange and attached to the latter there is an indicator, pointer or other suitable device, acting in conjunction with a scale plate or dial so arranged as to enable independent or individual figures, numerals or other designations to be moved around and secured to the scale plate.

The drum may be driven by a worm drive to impart a fore and aft or sliding movement and coupled with this movement the drum may be so geared that one complete revolution or circuit of the flange, either clockwise or anti-clockwise, will rotate the drum two, three or as many complete revolutions or circuits as may be required. Thus the ratio between the flange, or source of motion, and the drum may be 1:1, 1:2, 1:3 or other desired ratio.

As a modification, the drum may be rotated by imparting motion directly to the drum axle, the flange in this case remaining stationary but the scale plate turns in unison with the axle, and a handle or lever secured to the axle and protruding beyond the scale plate may be employed as a means to assist the movement.

In a modification two flanges may be used that are movable or adjustable relatively to one another.

The invention is particularly applicable to gauges for determining the liquid level in the petrol tanks of motor-cars, aeroplanes, motor-boats, storage tanks, ships and the like.

The accompanying drawings illustrate embodiments according to the invention.

In the drawings:—

Figure 4 is a detail section of part of drum with cable anchorage.

Figure 5 is a side view of Figure 4.

Figure 6 is a sectional elevation of gauge in which the flange or flanged member and transmission drum are revolvable together upon the tubular axle or hollow stationary member to which the outer casing is joined.

Fig. 6ª is a sectional detail illustrating one form of providing indicator elements which are adjustably movable around the dial-plate.

Figure 7 is a sectional elevation showing drum and indicating means or gauge associated with float device employed in tank.

Figure 1:
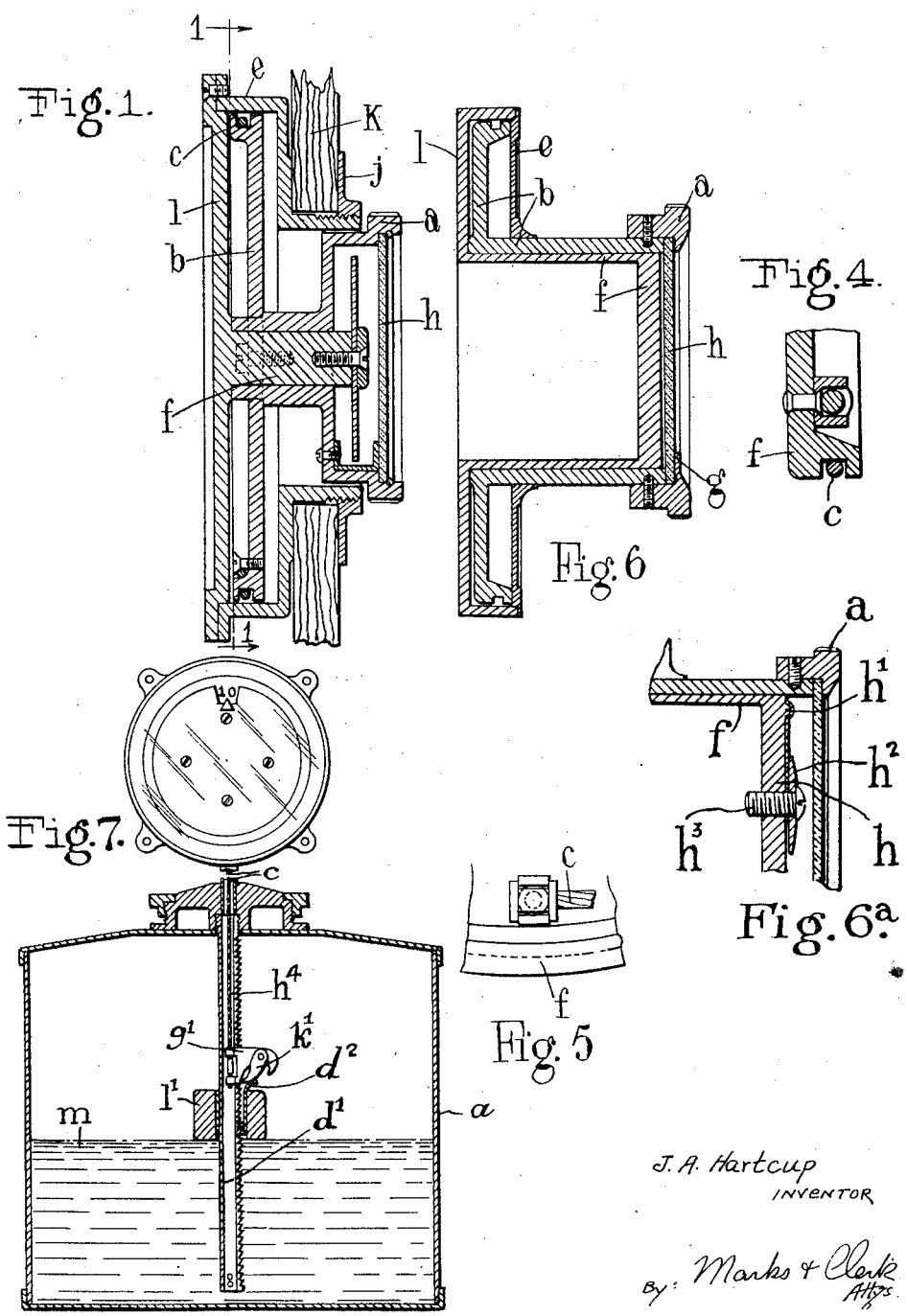
Figure 1 is a sectional elevation of gauge in which the transmission drum is driven by a rotary flange or flanged member.
Figure 2:
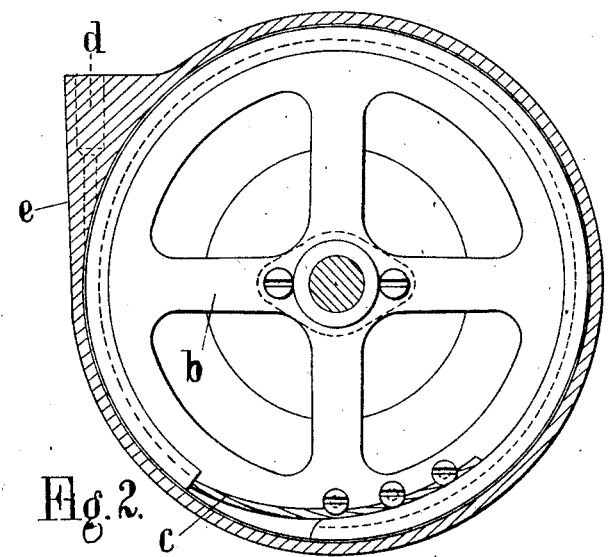
Figure 2 is a section on the line 1—1 of Figure 1, looking in the direction indicated by the arrow.
Figure 3:
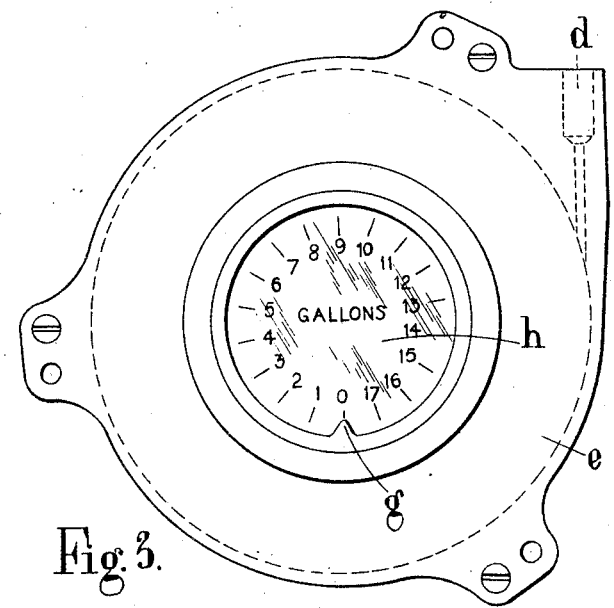
Figure 3 is a front elevation showing the dial or scale with pointer and outer casing with transmission cable exit indicated by dotted lines.

In carrying the invention into effect according to Figures 1 to 5, a flange $a$ rotates a drum $b$ anchored to which is a cable $c$, chain, or wire or transmission element, capable of being housed by the drum which takes on or pays out on the grooved surface of the drum $b$ as required when ascertaining the liquid level in the tank, the cable $c$ passes out through the exit $d$ in the outer casing $e$. The drum $b$ is housed in outer casing $e$ and is rotatably mounted on an axle $f$, the rotation of which is effected by the flange $a$. The movable member $a$ has an indicator $g$ and a scale plate $h$ is so made or arranged as to have independent figures, numerals, or other designations, movable upon and around and secured to the scale plate. A convenient mode of effecting this is to provide a circular rib $h'$ on the plate $h$ upon which independent numerals are adapted to be clamped or clipped by a plate $h^2$ and set-screw $h^3$ and movable around the rib at the points on the circular rib required for fixing the indications as to the tank contents.

An adjustable flange or rim $j$ is provided upon the outer casing and is for securing the gauge in position upon the dashboard, the woodwork of which is represented at $k$. $l$ is a plate forming the back of the gauge and connected to the axle $f$.

In Figure 6 the flange $a$ and drum $b$ turn together on the axle $f$.

The cable $c$ or flexible transmission is connected to the usual well known device plunger which is slidable upon a ratcheted rod placed in the tank; and according to which the plunger acts upon a metal or cork float to which is attached a pawl operating against teeth upon the rod. This device is not claimed as part of the present invention.

More particularly the float device as illustrated in Figure 7 comprises a plunger device $g'$ attached to the end $h^4$ of the operating cable $c$. The plunger $g'$ carries a pivoted pawl $k'$ to engage the teeth of the guide rod or tube $d'$ when, after lowering the plunger by operating the drum of the gauge, the said pawl comes in contact with the tang $d^2$ upon the float $l'$ when the liquid level is reached.

To ascertain the level according to my invention, it is necessary to rotate the dial over the scale, this imparts motion to the drum and this movement is transmitted through the cable to the plunger and float on the ratchet rod in the tank, and as soon as the float touches the liquid level, the pawl engages the ratchet teeth on the rod, preventing the operator moving the dial or indicator further. The quantity of liquid in the tank can then be read-off from the scale or dial, which shows the actual amount in gallons, or other approved designation, present in the tank.

The stopping action is absolutely positive, further movement of the dial being abruptly checked when the float reaches the fuel.

To ascertain contents of tank, the dial should be rotated in an anti-clockwise direction as far as it will go. This action causes the float to move down the ratcheted rod until it is in contact with the liquid, when it rises slightly, and the pawl on the float engages with the ratchet teeth and further downward movement is prevented. The reading then indicated by the pointer gives the quantity of liquid or fuel present in the tank.

After any one reading, it is necessary to unlock the float by rotating the dial in a clockwise direction; this lifts the float up and frees the pawl from the teeth upon the rod.

The invention provides a simple and efficient dial indicating means, which is capable of general application, and is intended principally for use in connection with the petrol tanks of automobiles, storage tanks, aeroplanes and the like.

Having now described my invention what I claim as new and desire to secure by Letters Patent is:—

1. In apparatus manually operable for indicating the level of liquids, especially that of petrol tanks, the combination of a rotary drum with shrouded annular grooved surface, an operating transmission cable co-acting with the grooved surface; means for anchoring one end of the cable to the grooved drum, an inlet formed in the drum through which the cable passes, the other end of the cable being in co-operative relation with the float device controlled by the liquid level in the tank; a dial-plate with indicating means arranged co-axially with the drum but separate therefrom; and a rotatable member at the front of the dial-plate, through which the drum is operable to control the cable when taking the liquid level and thereby the dial indication when the level is found.

2. In apparatus manually operable for indicating the level of liquids, especially that of petrol tanks, the combination of grooved rotary drum, an operating cable anchored therein at one of its ends, and the other attached to the float device controlled by the liquid level; a dial-plate with movable indicating elements arranged co-axially with the drum but separate therefrom; and a rotatable member, at the front of the dial-plate, through which the drum is operable to control the cable when taking the liquid level and thereby the dial indication when the level is found.

3. In apparatus manually operable for indicating the level of liquids, especially that of petrol tanks, the combination of a shrouded annular grooved rotary drum, an operating cable in co-operative relation therewith, a dial indicating plate co-axially arranged with the drum, and a rotatably mounted flange member at the front of the dial plate to actuate the drum and control the dial indications.

4. In apparatus manually operable for indicating the level of liquids, especially that of petrol tanks, the combination of a shrouded annular grooved rotary drum, an operating cable in co-operative relation therewith, a dial-plate with indicating means co-axially arranged with the drum, a manually rotatable member at the front of the dial-plate to control the drum, and means co-acting with the drum for controlling and regulating the winding or unwinding of the cable upon the grooved drum.

In testimony whereof I have signed my name to this specification.

JOHN ARCHIBALD HARTCUP.